United States Patent [19]

Ryu

[11] Patent Number: 5,084,650
[45] Date of Patent: Jan. 28, 1992

[54] THIN-FILM EL DISPLAY DEVICE HAVING A HIGH-CONTRAST RATIO

[75] Inventor: Jae H. Ryu, Seoul, Rep. of Korea

[73] Assignee: Goldstar Co., Ltd., Seoul, Rep. of Korea

[21] Appl. No.: 668,859

[22] Filed: Mar. 13, 1991

[30] Foreign Application Priority Data

Mar. 14, 1990 [KR] Rep. of Korea ............... 3427/1990

[51] Int. Cl.$^5$ ............................... H05B 33/22
[52] U.S. Cl. .................................. 313/507; 313/509
[58] Field of Search ............................... 313/507, 509

[56] References Cited

U.S. PATENT DOCUMENTS 3,560,784 2/1971 Steele et al. ............... 313/509 X

FOREIGN PATENT DOCUMENTS 0118390 10/1978 Japan ............... 313/509

Primary Examiner—Palmer C. DeMeo
Attorney, Agent, or Firm—Ostrolenk, Faber, Gerb & Soffen

[57] ABSTRACT

A thin-film EL display having a high-contrast ratio comprising a transparent ceramic substrate. A background electrode is formed on the lower surface of the ceramic substrate. A photochromism layer is formed on the upper surface of the ceramic substrate. The photochromism layer is black-colored when exposed to a required wavelength of light of 3,500 Å to 5,100 Å. Therefore, it is possible to avoid decrease in the contrast of the display device which may be caused by external light or light emitted from the fluorescent layer itself.

9 Claims, 1 Drawing Sheet

THIN-FILM EL DISPLAY DEVICE HAVING A HIGH-CONTRAST RATIO

BACKGROUND OF THE INVENTION

The present invention relates to an EL (electroluminescence) display device, more particularly, to a thin-film EL display device having a high-contrast ratio adapted to preventing contrast from being reduced by either a external light or a light generated from a fluorescent layer itself.

Conventionally, the ELD (electroluminescence display) generally having been used as a plane display device has been known as an alternative of CRT (cathode ray tube) in terms of highly increased luminance, longer life and lower drive voltage in spite of technical difficulties, because it is a self-luminescent device and an all-solid state device, differently from the existing LCD (liquid crystal display).

A typical example of the above-mentioned EL display device will now be described with reference to FIG. 1.

As shown in FIG. 1, the EL display device comprises a transparent substrate 1. A transparent electrode 2 of a uniform width is formed by first depositing a transparent layer of ITO (Indium Tin Oxide) over the upper surface of the transparent substrate 1 to have a surface resistance of $10\Omega$ per unit area by using a chemical vapor depositing method or a sputtering method and then line-etching said ITO layer by using a photoetching method. Next, a first insulating layer 3 of a uniform thickness is formed by depositing a dielectric material such as $Y_2O_3$, $SiO_2$, and $Si_3N_4$ over the upper surface of the transparent electrode 2, by using an EB (electron beam) method or the sputtering method. Thereafter, a fluorescent layer 4 is formed by depositing ZnS:Mn over the upper surface of the first insulating layer 3 by using the EB method or the sputtering method. On the upper surface of the fluorescent layer 4, a second insulating layer 5 is formed in the same manner as that of the first insulating layer. Finally, a background electrode 6 is formed by depositing an Al layer over the upper surface of the second insulating layer 5 by using the EB method or the sputtering method and thereafter line-etching said Al layer in vertical direction with respect to the transparent electrode 2. In the drawing, reference numeral 7 designates a power supply.

In the above-mentioned conventional EL display device, when a high voltage of AC 200V is applied between the transparent electrode 2 and the background electrode 6, electrons are trapped in the first and second insulating layers 3 and 5. On the other hand, electrons existing at the interfaces between the insulating layers 3 and the fluorescent layer 4 and between the insulating layer 5 and the fluorescent layer 4 are activated, by a high intensity of induced electric field, to be injected into the fluorescent layer 4. Upon entering the fluorescent layer 4, these electrons impact the luminescent centers of Mn atoms in ZnS of the fluorescent layer 4, thereby causing outer electrons in the Mn atoms to be excited. Then, the excited electrons in the Mn atoms are returned to their ground states releasing whatever energy they have, resulting in emission of light with a wavelength corresponding to an energy level gap. If the fluorescent materials are composed of ZnS; Mn, an intrinsic wavelength of 5850 Å is typically generated from Mn atoms.

The light emitted in the above-mentioned manner passes through the transparent electrode 2 toward the viewer. The light arrived at the background electrode 6 is reflected on the surface of the background electrode 6 to at least 90% to be again directed to the viewer.

Incident external light entering the transparent substrate 1 passes through each thin film layer formed on the transparent substrate 1 and is reflected at the background electrode 6 to be directed forwardly. However, this reflected light interferes with light emitted from the fluorescent layer 4, because of an extremely high transparency of its each thin film layer, thereby causing the contrast ratio between lighting pixel and unlighting pixel to be considerably lowered. Especially when ambient light is very bright, the displaying ability of the device is very reduced since luminance of the EL light and the reflected light are approximately equal to each other.

SUMMARY OF THE INVENTION

Therefore, an object of the present invention is to eliminate the above-mentioned disadvantages encountered in the prior art and to provide a thin-film EL display device having a high-contrast ratio which can prevent the contrast from being reduced by the external light or light from the fluorescent layer itself.

In accordance with the present invention, the object can be accomplished by providing a thin-film EL display device comprising: a transparent ceramic substrate, a background electrode formed on the lower surface of said ceramic substrate; a photochromism layer formed on the upper surface of said ceramic substrate, said photochromism layer being black-colored if exposed to a required wavelength of light; and a fluorescent layer, an insulating layer and a transparent electrode sequentially formed on the upper surface of the photochromism layer.

BRIEF DESCRIPTION OF THE DRAWINGS

The above and other objects, features and advantages of the present invention will be more clearly understood from the following detailed description taken in conjunction with the accompanying in which.

DETAILED DESCRIPTION OF THE INVENTION

Figure 1:
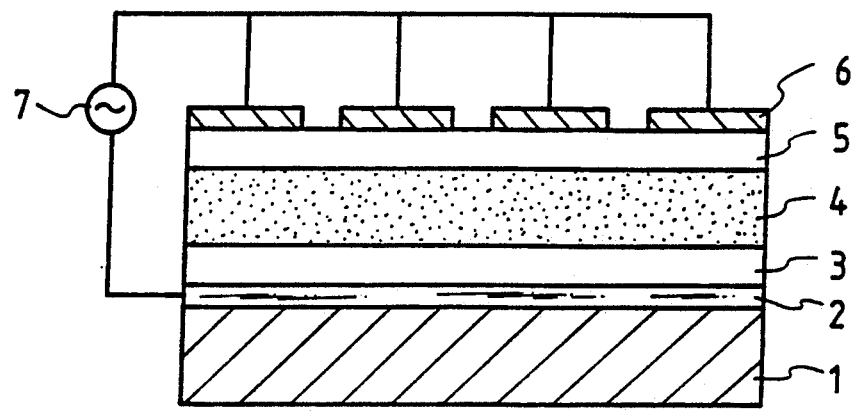
FIG. 1 is an enlarged sectional view showing a structure of a conventional EL display device.
Figure 2:
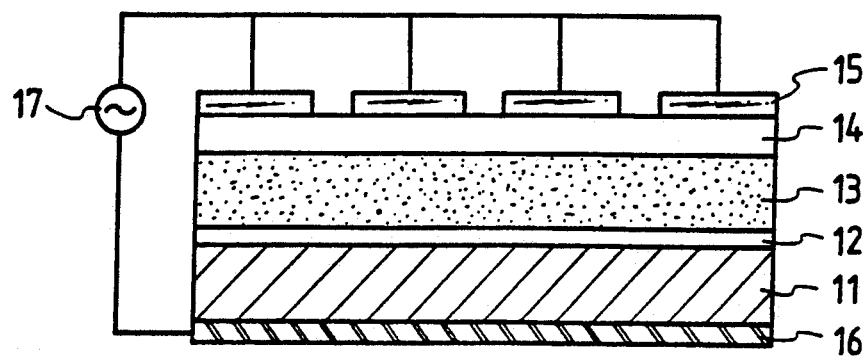
FIG. 2 is an enlarged sectional view showing a structure of a thin-film EL display device having a high-contrast ratio in accordance with the present invention.

Referring to FIG. 2, a thin-film EL display device according to the present invention, comprises a transparent ceramic substrate 11. On the upper surface of the ceramic substrate 11 is formed a photochromism layer 12 which becomes black-colored when exposed to a required wavelength of light. Next, a fluorescent material is coated on the upper surface of the photochromism layer 12 to form a fluorescent layer 13. Then, a dielectric material is coated on the upper surface of the fluorescent layer 13 to form an insulating layer 14. On the upper surface of the insulating layer 14 is formed a transparent electrode 15. Finally, a background electrode 16 is formed on the lower surface of the transparent ceramic substrate 11. In the drawing, reference numeral 17 designates a power supply.

In accordance with the above-mentioned EL display device of the present invention, EL light is emitted from the fluorescent layer 13 when AC voltage is applied between the transparent electrode 15 and the background electrode 16, and the contrast is enhanced by a light absorption effect of the photochromism layer 12 which becomes black-colored when exposed to a required wavelength of light. Thus, a clear image can be viewed through the EL display device of the present invention.

EXAMPLE

A substrate 11 is formed of PLZT((Pb, La)(Zr, Ti)$O_3$) ceramic material. The photochromism layer 12 is formed to have a thickness of 1,000 Å on the substrate 11 by a deposition of Fe-doped PLZT utilizing a sputtering method On the upper surface of the photochromism layer 12, the fluorescent layer 13 is formed to have a thickness of 6,000 Å to 10,000 Å by depositing a fluorescent material of SrS:Ce on said surface according to the EB method and at the temperature of 500° C. to which the substrate is heated. The second insulating layer 14 is formed of a dielectric material such as $SiO_2$, $Si_3N_4$, $SiOxNy$, or $Y_2O_3$ and is deposited on the upper surface of said fluorescent layer 13 by the EB method or the sputtering method. On the upper surface of the second insulating layer 14, an ITO layer is deposited by the CVD method or the sputtering method. This ITO layer is line-etched by using a photoetching method, in order to form a transparent electrode 15. On the lower surface of the PLZT ceramic substrate 11, an Al layer is deposited to have a thickness of 2,000 Å. Thereafter, the Al layer is line-etched in vertical direction with respect to the transparent electrode 2, thereby causing the background electrode 16 to be formed.

In accordance with the structure of the present invention as above-mentioned, the PLZT ceramic substrate 11 constituting an EL display device functions as an insulating layer corresponding to the first insulating layer 3 of the conventional EL display device. The PLZT ceramic substrate 11 which is of a strong dielectric material having dielectric constant of 900 to 5,000 has the property that drive voltage thereof is rather reduced in proportion to the increase in thickness thereof. This property is comparable with those of other dielectric materials. In the fluorescent layer 13, the luminescent centers of Ce in SrS of the SrS:Ce fluorescent material are doped to 0.1 mol % and uniformly distributed, so that blue-green color EL light having a peak at the range of 4,800 Å to 5,200 Å is emitted, when alternative voltage is applied between the transparent electrode 15 and the Al background electrode 16.

The photochromism layer 12 which is deposited on the upper surface of the PLZT ceramic substrate 11 by using a sputtering method has a property of being black-colored when exposed to the light having a wavelength of 3,500 Å to 5,100 Å.

In the above-mentioned EL display device of the present invention, when AC voltage is applied between the transparent electrode 15 and the Al background electrode 16, EL light with a wide wavelength of 4,800 Å to 5,200 Å is emitted from the fluorescent layer 13 of SrS:Ce fluorescent material. The EL light passes through the transparent electrode 15 toward viewers. Simultaneously, the light directed to the background electrode 16 is absorbed in the photochromism layer 12, thereby causing said photochromism layer 12 to be black-colored. Consequently, the EL light can not be directed to viewers.

In result, the contrast ratio of the selected luminescent area to the non-selected luminescent area is increased, by virtue of the colored photochromism layer 12. Namely, if more bright ambient light enters, it passes through the transparent electrode 15, the second insulating layer 14 and fluorescent layer 13 to be mostly absorbed into the photochromism layer 12, so that a background of a screen is black-colored. Consequently, EL display device having a high contrast can be obtained.

As apparent from the above description, the EL display device according to the present invention comprises a PLZT ceramic substrate provided at the upper surface thereof with a photochromism layer which is black-colored in absorbing light. The photochromism layer is provided at the upper surface thereof with a fluorescent layer of SrS:Ce fluorescent material. Therefore, it is possible to avoid decrease in the contrast of the display device which may be caused by external light or light emitted from the fluorescent layer itself.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A thin-film EL display device having a high-contrast ratio comprising:
    a transparent ceramic substrate;
    a background electrode formed on the lower surface of said ceramic substrate;
    a photochromism layer formed on the upper surface of said ceramic substrate, said photochromism layer being black-colored when exposed to a required wavelength of light; and
    a fluorescent layer, an insulating layer and a transparent electrode sequentially formed on the upper surface of the photochromism layer.

2. A thin-film EL display device having a high-contrast ratio in accordance with claim 1, wherein said transparent ceramic substrate is a PLZT ((Pb, La)(Zr, Ti)$O_3$) ceramic substrate.

3. A thin-film EL display having a high-contrast ratio in accordance with claim 2, wherein said PLZT is a strong dielectric material having a dielectric constant of 900 to 5,000.

4. A thin-film EL display having a high-contrast ratio in accordance with claim 1, wherein said photochromism layer comprises PLZT ((Pb, La)(Zr, Ti)$O_3$) doped with Fe, and is black-colored by light having a wavelength of 3,500 Å to 5,100 Å.

5. A thin-film EL display having a high-contrast ratio in accordance with claim 1, wherein said photochromism layer has a thickness of 1,000 Å.

6. A thin-film EL display having a high-contrast ratio in accordance with claim 1, wherein said fluorescent layer comprises a SrS:Ce fluorescent material.

7. A thin-film EL display having a high-contrast ratio in accordance with claim 6, wherein said SrS: Ce fluorescent material comprises SrS doped with Ce to 0.1 mol %.

8. A thin-film EL display having a high-contrast ratio in accordance with claim 6, wherein said fluorescent layer has a thickness of 6,000 Å to 10,000 Å.

9. A thin-film EL display having a high-contrast ratio in accordance with claim 1, wherein said insulating layer comprises a dielectric material selected from the group consisting of $SiO_2$, $Si_3N_4$, $SiOxNy$, and $Y_2O_3$.

* * * * *